(No Model.) 5 Sheets—Sheet 3.
G. B. WEBB.
TYPE WRITING MACHINE.
No. 453,683. Patented June 9, 1891.
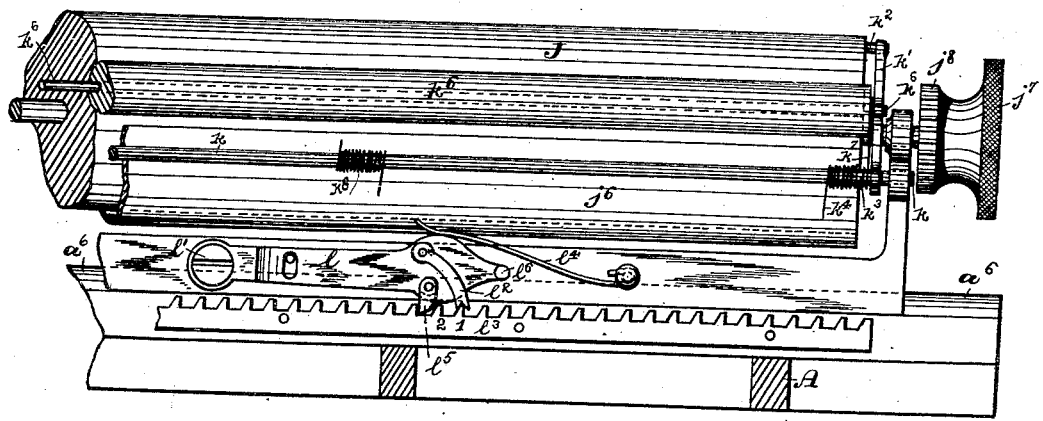
Fig. 6
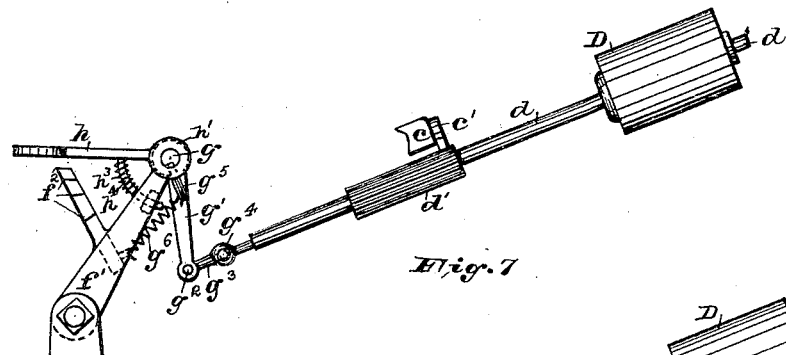
Fig. 7
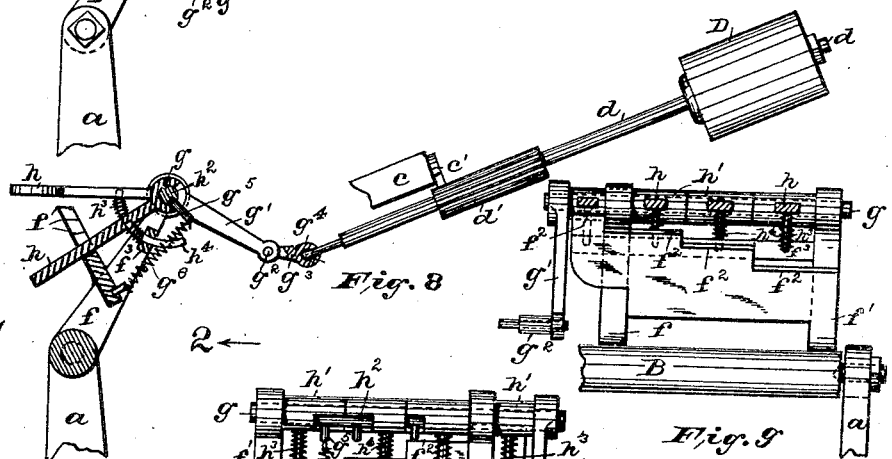
WITNESSES: 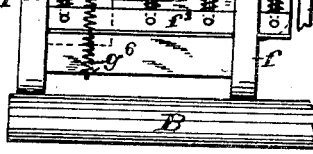 INVENTOR: 
Geo. B. Adams George B. Webb.
Russell Wright. BY Campbell & Co. ATTYS.

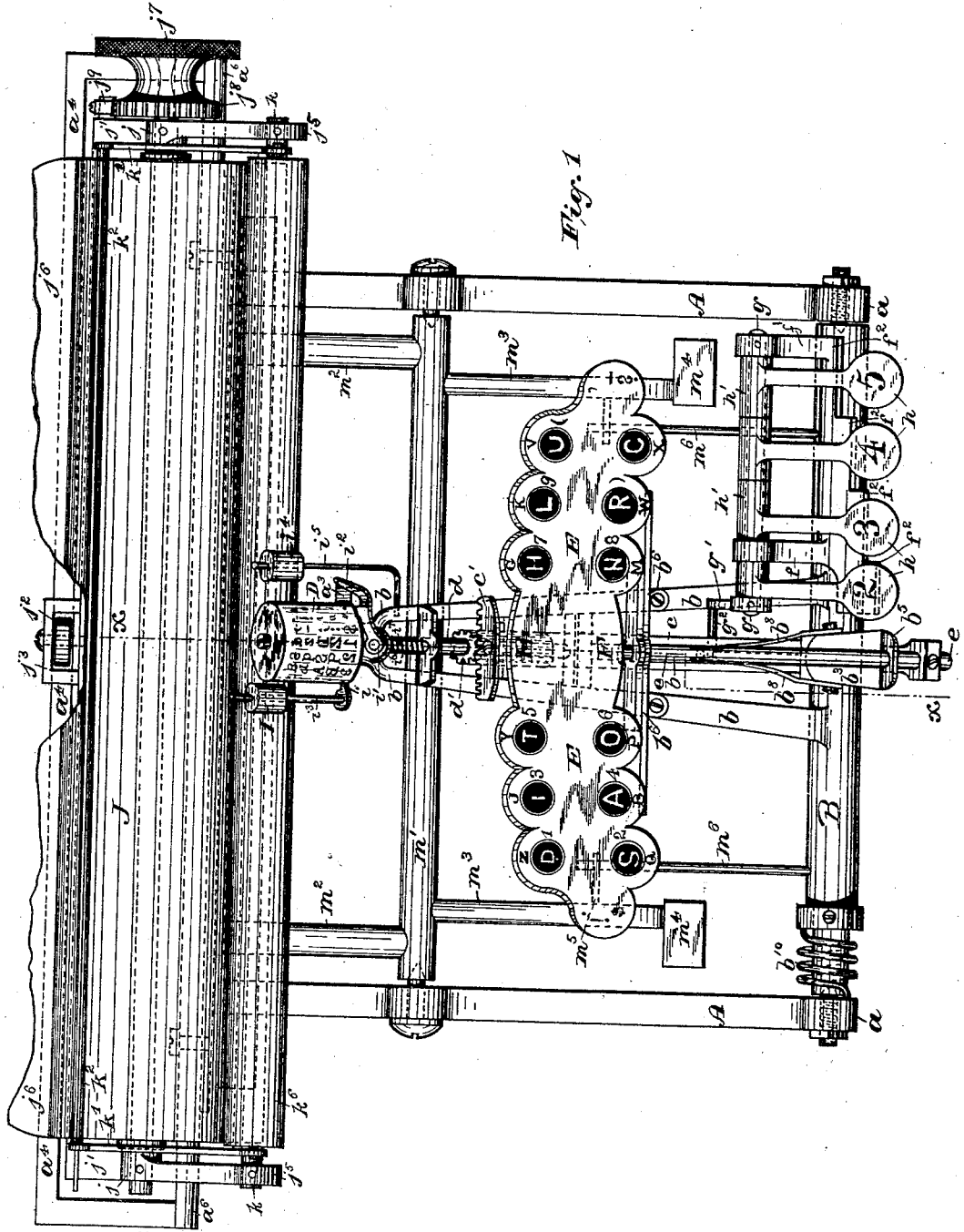

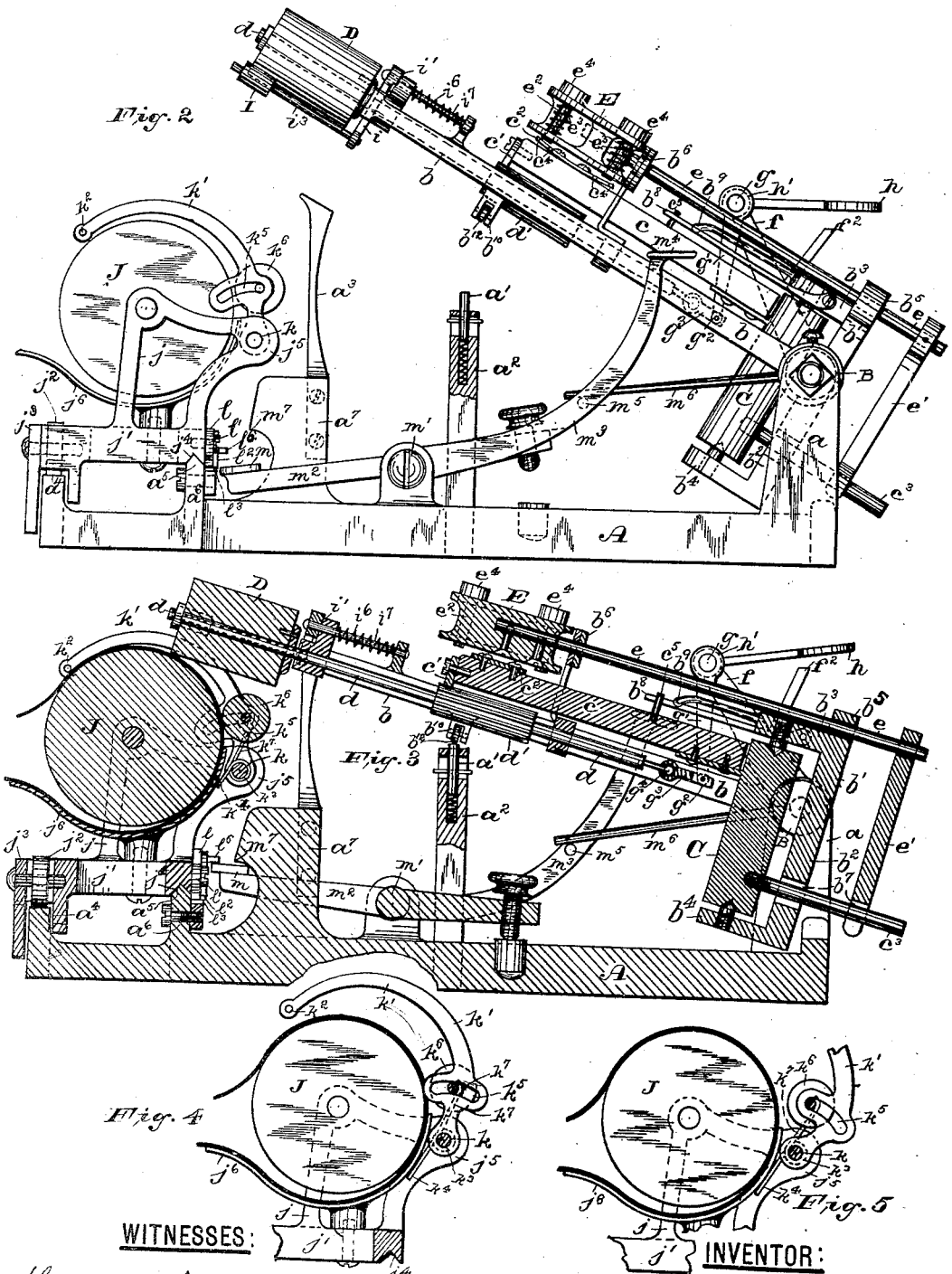

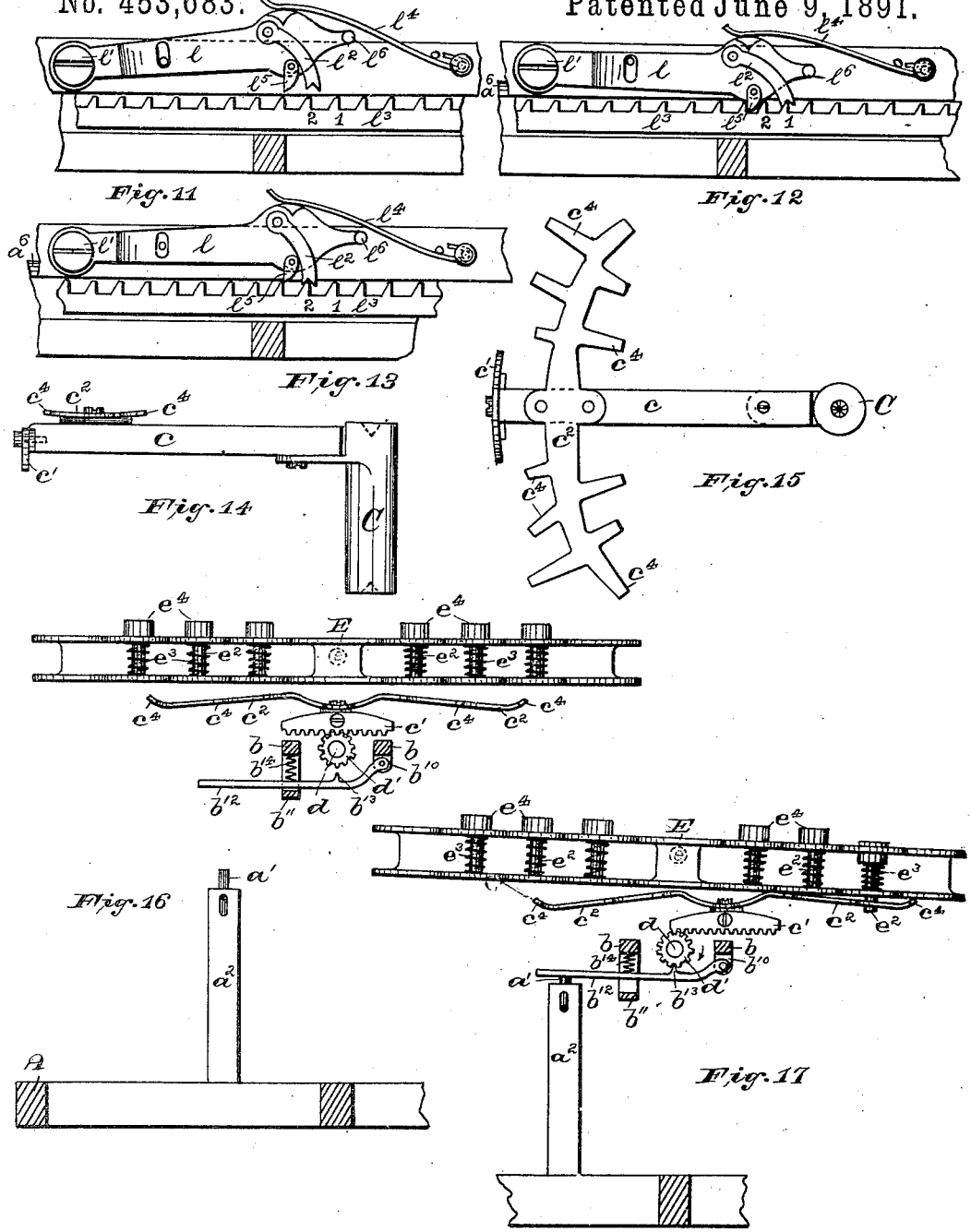

(No Model.) 5 Sheets—Sheet 5.

G. B. WEBB.
TYPE WRITING MACHINE.

No. 453,683. Patented June 9, 1891.

WITNESSES:
Geo. B. Adams
Russell Wright

INVENTOR:
George B. Webb.
BY Campbell & Co. ATTYS.

UNITED STATES PATENT OFFICE.

GEORGE B. WEBB, OF NEWARK, NEW JERSEY.

TYPE-WRITING MACHINE.

SPECIFICATION forming part of Letters Patent No. 453,683, dated June 9, 1891.

Application filed March 16, 1888. Serial No. 267,335. (No model.)

*To all whom it may concern:*

Be it known that I, GEORGE B. WEBB, a citizen of the United States, residing at Newark, in the county of Essex and State of New Jersey, have invented certain new and useful Improvements in Type-Writing Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The several objects of this invention, which relates generically to improvements in typewriting machines, are to produce a machine having much fewer number of parts than machines of a like nature capable of doing the same kind of work, and by thus reducing the number of parts to lessen the cost of construction thereof, to secure a machine more quiet in its action, and which by reason of its construction is lighter and consequently more portable than machines of more complicated construction, one the manipulation of which is easily learned, which is rapid in use, and which works easily and positively.

In the accompanying drawings is illustrated a machine embodying the principles of my invention, and which is described in the following specification, and the novel features thereof embodied in the clauses of the claim.

Figure 18:
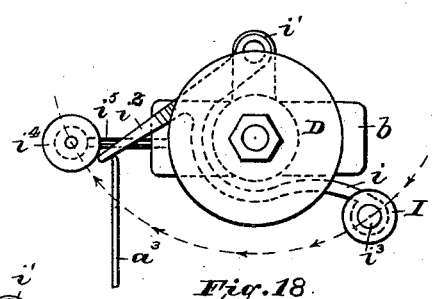
Figure 19:
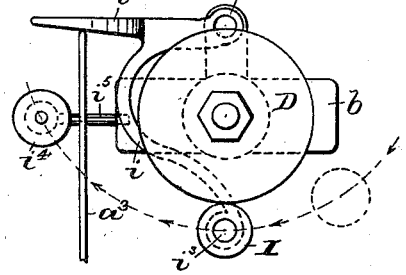
Figure 20:
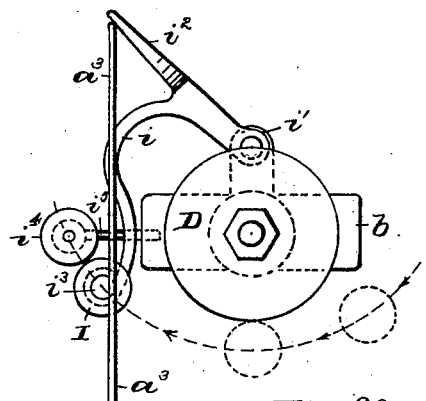
Figure 21:
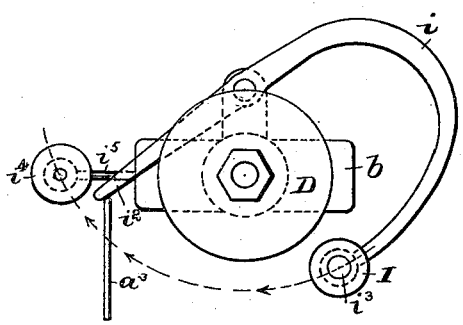

Of the views shown in said drawings, in which similar letters of reference designate like parts in each of the views, Figure 1 is a plan of my improved type-writing machine. Fig. 2 is a side elevation of the same in its normal unoperated position. Fig. 3 is a transverse section of the same in its printing position, taken centrally therethrough. Fig. 4 is an end elevation of the paper-holding roll, showing the paper-holding frame lifted from the roll; and Fig. 5 is a view similar to the last-named figure, showing the paper-holding frame and roll both lifted clear from the paper-holding roll or printing-bed. On Sheet 3, Fig. 6 is a side elevation of a portion of the paper-carriage, showing the propelling mechanism therefor. Fig. 7 is a side elevation in detail of the mechanism for sliding the typewheel, which is shown in its normal unoperated position. Fig. 8 is a view of the same parts, showing the relation of the same when the type-wheel is projected to its farthest extent, a portion of said view being in section. Fig. 9 is an elevation looking in the direction of the arrow 1, the keys being sectionized; and Fig. 10 is an elevation of the same mechanism, looking in the direction of the arrow 2 on Fig. 8. On Sheet 4, Fig. 11 is a front elevation in detail of the carriage-propelling mechanism, shown in a position disengaged from the rack. Fig. 12 is a similar view of the same mechanism shown in that position which it assumes after having engaged with the rack and propelled the carriage a distance equivalent to one tooth of the rack. Fig 13 is a similar view of the same mechanism, showing the position of the parts when the pawl has engaged with the rack, but before the carriage has been propelled. Fig. 14 is a side elevation of the oscillating arm and shaft to which is secured the toothed segment and the stop-plate. Fig. 15 is a top view of the same. Fig. 16 is a detailed view showing a front elevation of the key or finger board, the stop-plate, toothed segment, &c., in their normal unoperated position; and Fig. 17 is a view of the same parts shown in Fig. 16 in their operated position. On Sheet 5, Fig. 18 is an end elevation of the type-wheel and the mechanism for inking the same, shown in its normal unoperated position. Fig. 19 is a similar view of the same mechanism shown in that position which it assumes in inking the typewheel; and Fig. 20 is a view of the same part shown in the said last-named figures, with the addition of the device for applying ink to the inking-roller, said parts being shown in the position which they take after the inkingroller has inked the type-wheel and passed to the opposite side thereof. Fig. 21 is a modification of the inking mechanism.

As indicated in the views of said drawings, the type-wheel, the inking mechanism, and also the mechanism for rotating and sliding the said type-wheel for bringing the various characters to the printing-point are all arranged and carried in the same rocking frame. By virtue of this arrangement all the parts for operating the type-wheel are compactly located and conveniently placed, so that the machine can be operated with facility and rapidity.

A in said drawings indicates the bed or base, which constitutes the frame-work of the machine, from which rise standards $a$ between, and in which is journaled the main shaft B of the rocking frame. Projecting from said shaft B are arms $b$, which extend out toward the paper or printing roll, and in the end of which is journaled the type-wheel shaft, which also extends down between said arms toward the shaft B of the rocking frame, substantially as indicated more particularly in Fig. 3 of the drawings. The rock-shaft B is provided with oppositely-projecting arms $b'$ $b^2$, from which extend projections $b^3$ and $b^4$, between which is journaled a rocking or oscillating shaft C, which carries the oscillating arm $c$, to the end of which is secured the toothed segment $c'$, and upon the top of said arm is arranged the stop-plate $c^2$. This oscillating arm plays directly above the arms $b$ of the rocking frame, between which the type-wheel shaft $d$ extends, and the toothed segment on said arm meshes with the pinion $d'$ on said type-wheel shaft, and by the oscillation of said arm C a rotary motion is imparted to said pinion to the type-wheel shaft, and also to the type-wheel D, which is secured to the end of said shaft.

Projecting upwardly from the arms $b$ and $b'$ of the rocking frame are bearing-plates $b^5$ and $b^6$, in which is journaled the finger-board shaft $e$, to which is secured the finger-board E, which is arranged directly above the stop-plate $c^2$ on the oscillating arm $c$.

By reference to Figs. 1, 3, 16, and 17, it will be seen that the finger-board shaft $e$ is arranged in a vertical line directly above the type-wheel shaft $d$, the purpose of which arrangement will be seen more clearly hereinafter. As thus arranged the finger or key board is pivoted directly above the type-wheel shaft, so that the same is free to vibrate on either side of the pivotal point, the key-board shaft being secured to the center of the key-board. The vibratory movement of the key-board and shaft $e$ is communicated to the oscillating arm $c$ and the parts which it operates by means of the fork $e'$, secured to the end of the shaft $e$, the forked end of said rod $e'$ engaging with a pin or bar $c^3$, projecting from the oscillating shaft C through a slot $b^7$ in the arm $b^6$ of the rocking frame. By means of this connecting mechanism when the finger or key board is pressed on either side of the pivotal point the toothed segment moves in the same direction as the depressed end of the key-board, substantially as indicated in Fig. 17, and in consequence the type-wheel shaft and type-wheel are caused to move in the same direction.

By reference to Figs. 16 and 17 it will be seen that the stop-plate $c^3$ is carried with the oscillating arm as it moves beneath the finger or key board.

In order to limit the extent of the vibration or movement of the key-board and also to lock or stop the oscillating arm at any desired point, I have provided a series of pins $e^2$, working in and projecting above the finger-board, which when depressed project from the under side of said board and engage with the arms $c^4$ on the stop-plate. These arms on the stop-plate are so arranged that when its corresponding pin in the key-board engages with any one of the arms, the movement of the key-board and of the oscillating arm is limited to such an extent that a certain character on the type-wheel is rotated or presented to the printing-point according to the letter indicated on the key-board on or contiguous to the pin which is depressed. Thus each character on the type-wheel has its corresponding pin on the key-board, which is properly indicated, so that the operator understands which pin to depress to bring any character to the printing-point. Spiral springs $e^3$ co-operate with the pins to restore the same to their normal position when released from the pressure of the finger. As indicated in Figs. 1 and 2, each pin is provided with a head or finger piece $e^4$, upon which is placed a character or letter, thus causing the type-wheel to print the corresponding character or letter on the paper, the limit of rotation of which is controlled by that particular pin.

Springs $b^8$ are secured to opposite sides of the arm $b^3$, as indicated in Figs. 1 and 2, and engage with opposite sides of a pin $c^5$ on the oscillating arm $c$, projecting up between the ends of said springs. The function of these springs is to return the oscillating arm to its normal position directly above the type-wheel shaft. A finger $b^9$ projects from the said arm $b^3$ down between the said springs and prevents either of said springs from following the other when pressed to one side by the operation of the oscillating arm. By this arrangement the unoperated spring is prevented from exerting or opposing any resistance to the operating-spring in returning the oscillating arm to its normal position.

In order to prevent the type-wheel from turning after by the movement of the key-board any character is brought around to the printing-point, I have provided the device shown more particularly in Figs 16 and 17, which consists of slotted lugs $b^{10}$ and $b^{11}$, projecting downwardly from the arms $b$ of the rocking frame and pivoted in the slotted lug $b^{10}$, and extending through and beyond the slot in the lug $b^{11}$ is an arm or lever $b^{12}$ provided with a locking point or projection $b^{13}$, directly beneath the pinion $d'$ on the type-wheel shaft.

In Fig. 16 is indicated the normal disengaged position of the locking-lever, while in Fig. 17 is shown the locked position of the same, in which by the downward movement of the rocking frame the end of said lever $b^{12}$ engages with the spring-actuated pin $a'$, arranged in a post $a^2$, projecting upwardly from the bed of the machine, and by said engagement the point $b^{13}$ is caused to engage with the teeth of the pinion, and thereby prevent any further movement thereof, substantially as indicated in said Fig. 17. When the rocking frame is released and permitted to rise, the lever $b^{12}$ is lifted clear from the pin $a'$ and the spring $b^{14}$ restores said lever to its normal position, as indicated in Fig. 16.

As hereinbefore mentioned, the mechanism for sliding the type-wheel so as to bring the characters in any one of the parallel rows of type which surround the periphery of the wheel into that position in which, by the operation of the rotating mechanism, any one of the characters in any of said rows is brought to the printing position, is arranged in the same rocking frame as the rotating mechanism.

As indicated in the drawings, the mechanism for producing the sliding movement of the type-wheel consists of a series of keys, one for each row of type on the wheel, each of said keys being independently connected with the type-wheel shaft and having such a degree of movement as will bring the row of type corresponding to each key to the printing-point.

The particular mechanism shown in the drawings consists of two standards $f$ and $f'$, projecting from the main shaft B of the rocking frame, and journaled in said standards is a shaft $g$, to one end of which is secured a crank-arm $g'$, from which projects a pin $g^2$, and connecting said pin with the end of the type-wheel shaft is a jointed link $g^3$, in which is formed a ball-and-socket joint $g^4$, substantially as indicated in Figs. 7 and 8. The object in thus using a ball-and-socket joint in the link connecting the type-wheel shaft and crank is to permit said shaft to rotate freely and at the same time to provide a suitable connection with the sliding mechanism. Each of the keys $h$ turns on the shaft $g$ by means of a collar $h'$, through which said shaft passes, and in each of said collars is a recess $h^2$, through which project pins $g^5$ on the shaft $g$, substantially as indicated in Figs. 8 and 10. When either of said keys is turned, the side of the recess in the collars engages the pin projecting therethrough on the shaft $g$ and causes said shaft to turn, which in turn produces the sliding movement of the type-wheel shaft and type-wheel through the connecting mechanism hereinbefore described. The degree or extent of movement of each of said keys is limited or defined by the stops $f^2$. (Indicated in Fig. 7, &c.) Springs $g^6$ cause the return of the shaft $g$ and the sliding type-wheel to its normal position, and springs $h^3$, encircling the curved arm $h^4$, that project from the under side of each key and work through a plate $f^3$ on the standard, cause the return of the keys to their normal position. (Indicated in Fig. 7.) By this arrangement of the sliding mechanism a type-wheel of smaller diameter may be used, but of increased length, and thus avoiding the necessity of increasing the extent of the vibration of the key-board, and by arranging the keys which control the sliding mechanism in the same rocking frame immediately in front of and in the same plane, or nearly so, with the key-board and adjacent thereto they are conveniently placed for rapid manipulation.

The mechanism for inking the type-wheel is shown more in detail in Figs. 18, 19, and 20, and consists, essentially, of an inking-roller held normally out of the path or line of movement of the type-wheel as it oscillates up and down, but which is caused to vibrate or move in a line crossing the path or line of movement of said type-wheel and to brush or rub the face thereof at the printing-point, and then moves out of the way of said type-wheel, which is free to move downward to the printing roll or bed. As the type-wheel returns to its normal position, the inking-roll returns to the opposite side of said type-wheel, which is its normal position. The mechanism shown in the drawings for accomplishing this end consists of an arm $i$, which carries the inking-roll I, said arm being pivoted at $i'$ to the arms $b$, that carry the type-wheel, and is also provided with an arm or finger $i^2$. The inking-roll is secured in the arm $i$ by means of the bar or rod $i^3$. When the type-wheel is elevated in its normal position, the relative position of the type-wheel and roller is as indicated in Fig. 18, the type wheel, however, being elevated at a greater distance above the stop or post $a^3$ than is shown in said Fig. 18, in which the type-wheel is shown as having been lowered until the finger $i^2$ engages with the top of the stop, but before it has caused any movement of the inking mechanism. As the downward movement of the type-wheel continues, the engagement of the finger $i^2$ and stop $a^3$ causes the inking-roller to move to the position shown in Fig. 19, in which it presses or rubs against the face of the type-wheel, and as the type-wheel still further continues its downward movement the engaging finger and stop has caused the inking-roll to move to the position indicated in Fig. 20, where it engages with the ink-supplying roll or pad $i^4$, which is secured to the arms $b$ of the rocking frame by the rod $i^5$. This latter position of the inking-roll is maintained until the type-wheel has left its imprint upon the paper-holding roll, and while the same is rising to its normal position and until the finger and stop are released from their engagement, at which time the inking-roll returns to its normal position, which is indicated in Fig. 18.

By reference to Figs. 18 to 20, inclusive, it will be seen that the arm $i$ extends around and beneath the type-wheel from the side opposite to that on which the inking-roll is placed when in its normal position; or, in other words, the said inking-roll is attached to a pivoted arm which extends from that side of the type-wheel toward which said inking-roll is designed to move as it inks the face of said type-wheel. The relative movements of the inking-roll and type-wheel are designed to be so timed that the inking of the roll takes place after the type-wheel has been rotated so as to bring the desired character to the printing-point, and while said type-wheel is being lowered toward the paper-holding roll. The inking-roll I, which is attached to the arm $i$, is caused to return to its normal position when the type-wheel has been raised from the paper-supporting roll by means of a spring $i^6$, wound around a rod $i^7$, which is pivoted at $i'$ to the type-wheel-carrying arms $b$, as will be readily seen from Figs. 1, 2, and 3.

The mechanism for receiving the paper and for moving the same beneath the type-wheel consists of the roll J, journaled in standards $j$, rising from the bed $j'$ of the carriage, which is provided with one or more friction-rolls $j^2$, journaled in a suitable yoke $j^3$ at the rear of the bed of the carriage, said roller moving on a planed surface $a^4$ on the bed of the machine, the front of the carriage being provided with a V-shaped recess at $j^4$, which receives and moves on a projection or way $a^5$, formed on the top of the flange $a^6$, which projects upwardly from and extends the length of the machine. As thus constructed it will be apparent that the entire carriage can be lifted directly from the bed of the machine, and when in position the yoke prevents the same from becoming accidentally separated from the bed of the machine. As indicated in Figs. 1 to 5, inclusive, the standards $j$ are provided with extended arms so constructed as to form bearings $j^5$ to receive the journals of the shaft $k$, to which is secured and from which springs the arms $k'$ of the paper-holding frame, which are connected by a bar $k^2$ at their ends, substantially as indicated in Fig. 1. The engagement of the paper-holding frame with the paper-supporting roll is maintained by means of the spiral springs $k^3$, which encircle the shaft $k$, one end of said spiral springs $k^4$ engaging with the under side of the curved paper shield or protector $j^6$, as indicated in Figs. 4 and 5, a spring $k^8$ surrounding the rod $k$, as shown in Fig. 6, being employed to hold the frame $k$ in place. In each of the arms $k'$ of the paper-holding frame are curved slots $k^5$, in which work the journals of a roller $k^6$, which is employed to press the paper upon the paper-supporting roll, the pressure of said roll $k^6$ being caused by the other end $k^7$ of the spiral spring $k^3$, said ends $k^7$ engaging with the journals of the roll $k^6$, substantially as indicated in Figs. 4 and 5. As thus constructed it will be seen the main portion of the paper-holding frame may be lifted clear of the paper-roll or supporting-bed a short distance, as indicated in Fig. 4, without removing the roll $k^6$ from its contact with the bed. By lifting the paper-frame still further, as indicated in Fig. 5, the roller $k^6$ is also carried away from the paper-supporting roll, substantially as indicated in Fig. 5.

As indicated in Fig. 1, the paper-roll is provided with a milled finger-piece $j^7$, whereby the same may be turned, and on said finger-piece are ratchets $j^8$, with which a detent or pawl $j^9$ engages to hold said paper-roll in any desired position.

In Figs. 6, 11, 12, and 13 is illustrated the mechanism employed to propel the carriage beneath the type-wheel after the printing of each character or in spacing. Said mechanism consists, essentially, of a pivoted lever, to which is pivotally secured a pawl, a stop for controlling the movement of said pawl, and a spring or other suitable means engaging with said pawl or the end of the pivoted lever to depress the same. As indicated in the detail views on Sheet 4 of the drawings, the pivoted arm or lever $l$ is secured to the front of the base or bed of the carriage at $l'$, and to said lever, preferably near the end thereof, is pivoted a pawl $l^2$, which engages with the teeth of the rack $l^3$, arranged below said pawl and attached to the flange $a^6$ on the bed of the machine. The spring $l^4$, suitably placed, engages with the end of the pivoted lever $l$ and acts to press the same down toward the rack and to hold the pawl in engagement with the teeth thereof. On said lever $l$ is a stop $l^5$, with which the pawl engages when lifted clear of the rack, substantially as indicated in Fig. 11, and on the end of said lever is provided a projection $l^6$, with which the plate $m$ on the mechanism that controls the operation of the carriage-propelling device engages in raising the end of the pivoted lever, whereby the pawl is lifted clear of the rack.

By reference to the detail views, Figs. 11, &c., it will be seen that the pawl is not pivoted to the lever $l$ directly above the stop $l^5$, but that the pivotal point of said pawl is back of said stop, or toward the point of attachment $l'$ of the lever $l$ to the carriage.

The operation of the device is as follows: The position of the parts when unoperated and at rest is shown in Fig. 12, in which it will be noticed that the gravity-pawl engages with a tooth on the rack numbered 1, and that there is a space intervening between the pawl and the stop $l^5$ when the parts are in this position. When the pivoted lever $l$ is raised so that the pawl clears the rack, the said pawl drops automatically until it strikes the stop $l^5$, and when in this position is directly above the next tooth on the rack numbered 2, so that when the lever $l$ is allowed to fall a sufficient distance the end of said pawl engages with said tooth substantially as indicated in Fig. 13. Up to this point in the operation of the device there has been no movement of the carriage; but as the pivoted lever is permitted to fall still farther the downward pressure of the spring $l^4$ upon the end of said lever causes the carriage to move forward until the pawl assumes the position shown in Fig. 12, which is its position of rest. By this construction a very simple, and yet positively-acting, device is provided for propelling the carriage, and which, because of its simplicity, can be cheaply made and is not liable to become disarranged.

The mechanism for operating the carriage-propelling device consists of a rocking shaft $m'$, journaled in the bed of the machine, from which shaft project arms $m^2$, to the ends of which is secured the plate $m$, already referred to, that engages with the projection on the end of the pivoted lever $l$, as hereinbefore described. Projecting in an opposite direction from said rocking shaft $m'$ are arms $m^3$, provided on the end thereof with finger-plates $m^4$, substantially as indicated in Fig. 1. Any downward pressure applied upon the plates $m^4$ elevates the plate $m$ on the opposite side of the rocking shaft, which in turn lifts the pivoted lever of the carriage-propelling device, as already described. This mechanism constitutes or has the same function as what is known as the "spacer" in other forms of type-writing machines. In order that the carriage may be automatically propelled after each character has been printed, and that the same operation which prints the character shall at the same time cause the carriage-propelling device to move the same, I have provided a pin $m^5$, projecting from one of the arms $m^3$, and engaging with said pin — which is dotted beneath the key or finger board in Fig. 1—is an arm $m^6$, secured to and projecting from the main shaft B of the rocking frame. Hence from this construction it will be apparent that any downward movement of the rocking frame actuates the spacing mechanism simultaneously therewith. To prevent an excessive movement of the spacing mechanism, the plate $m$ is caused to engage with the upright $a^7$ at the point $m^7$, substantially as indicated in Fig. 3. A spiral spring $b^{10}$, suitably secured around the main shaft B, is employed to restore the rocking frame to its normal unoperated position, as shown in Fig. 2. The stop $l^5$ also acts as a locking-tooth to prevent any movement of the carriage when the pivoted lever falls and the pawl engages the rack. Instead of using this same stop as a locking-tooth, an independent tooth can be used for that purpose.

From the above description of my improved type-writing machine it will be seen that it consists, essentially, of a moving finger-board which actuates the type-wheel by suitable devices for transmitting said motion, and provided with stop mechanism whereby the degree or extent of movement of the finger-board is so regulated and limited that any particular character on the type-wheel can be brought to the printing-point by means of the independently-operating stops. In this my machine differs from other machines.

In Fig. 1 is indicated the arrangement of the characters on the indicating or finger-board.

Having thus described my invention, what I claim is—

1. In a type-writing machine, the combination of a frame, a rock-shaft having projections thereon, an oscillating shaft between said projections, a rotating type-wheel shaft and a type-wheel thereon, a finger-board arranged on a shaft directly above and in line with the type-wheel shaft, adapted to vibrate on either side of said shaft, and means attached to said oscillating shaft connected with the finger-board and engaging with the type-wheel shaft, whereby said shaft and its type-wheel are caused to rotate, for the purposes set forth.

2. In a type-writing machine, the combination of a frame, a rock-shaft having projections thereon, an oscillating shaft between said projections, a rotating type-wheel shaft and a type-wheel thereon, a vibrating finger-board arranged on a shaft directly above and in line with the type-wheel shaft, adapted to vibrate on either side of said shaft, a stop-plate arranged on the oscillating shaft, stops or pins in the vibrating finger-board adapted to engage with said stop-plate to regulate the degree of vibration of the finger-board, and means attached to said oscillating shaft whereby the movement of said board is caused to rotate said type-wheel, for the purposes set forth.

3. In a type-writing machine, the combination of a frame, a rock-shaft having projections thereon, an oscillating shaft pivoted between said projections, a rotating type-wheel shaft, and a type-wheel thereon, a vibrating finger-board arranged on the shaft directly above and in line with the type-wheel shaft, adapted to vibrate on either side of said shaft, means connecting the opposite and free end of said finger-board shaft with the oscillating shaft, whereby the vibratory movement of the finger-board is caused to oscillate said oscillating shaft, a stop-plate arranged on an arm on said oscillating shaft, stops or pins in the vibrating finger-board adapted to engage with said stop-plate to regulate the degree of vibration of the finger-board, and means on said oscillating shaft whereby the movement of said board is caused to rotate said type-wheel shaft and its type-wheel thereon, for the purposes set forth.

4. In a type-writing machine, a rotating type-wheel, a shaft to which the same is secured, having a pinion secured thereon, a toothed segment meshing with said pinion, a vibrating finger-board, depressible and spring-actuated stops arranged in said finger-board and extending therethrough, a stop-plate arranged beneath said finger-board, with which said stops engage when depressed and whereby the vibration of said finger-board is regulated, and means whereby the vibration of the said board is caused to actuate said segment, for the purpose set forth.

5. In a type-writing machine, a rotating type-wheel, a shaft to which said wheel is secured, having a pinion thereon, an oscillating arm carrying a toothed segment meshing with said pinion, a stop-plate secured to and moving with said oscillating arm, a vibrating and pivoted finger-board arranged above said stop-plate and provided with depressible stops or pins which when depressed engage with the stop-plate and limit the extent of movement of the board, and means for causing the vibrating movement of the finger-board to operate the oscillating arm, for the purposes set forth.

6. In a type-writing machine, a rotating type-wheel, a shaft to which said wheel is secured, having a pinion thereon, an oscillating arm carrying a toothed segment meshing with said pinion, a stop-plate on said arm, a shaft from which said arm projects and provided with an oppositely-projecting pin, means for returning said arm to its normal position, a finger-board pivotally arranged above said stop-plate and in a line with the type-wheel shaft, and provided with stop-pins therein, and a shaft, with which said board turns, projecting backward from said board and provided with a fork engaging with the pin projecting from the oscillating-arm shaft, for the purposes set forth.

7. In a type-writing machine, the combination of a main frame provided with a rock-shaft having arms thereon, a rotating type-wheel having rows of letters, &c., around the periphery thereof, a sliding shaft to which said wheel is secured, said shaft sliding in bearings on the arms on said rock-shaft, a series of operating-keys independently connected with said sliding shaft, each of which is constructed and arranged to slide the type-wheel, whereby a different row of type is brought to the printing-point, said rock-shaft, by which said wheel-shaft, operating-keys, and connecting mechanism are carried, being arranged in the main frame and operating as set forth, and which when depressed causes the said type-wheel to engage with the paper-supporting roll, for the purposes set forth.

8. In a type-writing machine, a rotating type-wheel, a shaft to which said wheel is secured, and provided with a pinion thereon, an oscillating shaft provided with an arm carrying a toothed segment meshing with said pinion, a vibrating finger-board secured on a shaft in a vertical line with said type-wheel shaft, means consisting, essentially, of an arm connecting said finger-board shaft and oscillating shaft, as set forth, whereby the vibratory movement of said finger-board causes the toothed segment to actuate the type-wheel shaft, depressible stopping devices in said finger-board, a stop-plate beneath said finger-board, with which said depressible stopping devices engage and whereby the extent of the movement of said finger-board is regulated, and a rocking frame in which all the parts above mentioned are arranged and operate for the purposes set forth.

9. In a type-writing machine, the combination, with an oscillating type-wheel, a shaft to which said type-wheel is secured, and a rocking frame by which said wheel and its shaft are carried, of an inking-roller normally held on one side of the line of movement of said wheel and vibrating in a line crossing the line of movement of the type-wheel, an arm by which said roller is carried, pivoted to said rocking frame and extending beneath the type-wheel to the side opposite to the normal position of said roller and provided with a projecting finger, a fixed stop with which said finger engages during the downward movement of said rocking frame, whereby the roller is caused to move across the line of movement of the type-wheel and brush the face thereof, bearings on said rocking frame to which said roller-carrying arm is pivoted, and means arranged between said bearings for returning said roller to its normal position, as set forth.

10. In a type-writing machine, a vibrating character-indicating board provided with spring-actuated keys or stops therein adapted to be depressed, and extending below the character-indicating board, a rotating type-wheel arranged on a shaft below said vibrating character-indicating board, an oscillating shaft having an arm thereon provided with devices with which said spring-actuated keys or pins engage and by means of which the extent of movement of the character-indicating board is automatically limited, for the purposes set forth.

11. In a type-writing machine, in combination, a frame provided with standards, a rock-shaft, a rotating type-wheel secured between arms to said rock-shaft, a vibrating character-indicating or finger board, a shaft on which said finger-board is arranged and thereby secured to the rock-shaft, and means co-operating with said rock-shaft whereby the movement of said board rotates the type-wheel, independently-arranged stops or pins arranged and working in said board, and means to cause said pins or stops to return to their normal positions when released, as and for the purposes set forth.

12. In a type-writing machine, a rotating type-wheel, an independently-moving character-indicating or finger board, a shaft on which said board is secured, an oscillating shaft provided with an arm, a fork connecting and engaging with said finger-board-carrying shaft, and a pin on the oscillating shaft, and means on said arm on the oscillating shaft whereby the movement of said board rotates said type-wheel, for the purposes set forth.

13. In a type-writing machine, a rotating type-wheel, a shaft to which said wheel is secured, an independently-moving character-indicating or finger board working in unison with said type-wheel, a shaft on which said board is secured, means whereby said board causes the synchronous movement of the type-wheel, a rocking frame in which said parts are arranged, a rock-shaft, and means on said shaft connected with the type-wheel shaft by a system of levers arranged on the end of said rock-shaft for causing the sliding movement of the shaft having the type-wheel thereon, and thereby bringing a different row of type to the printing-point, as and for the purposes set forth.

14. In a type-writing machine, a rotating type-wheel, an independently-moving character-indicating or key board, a shaft on which said board is secured, said shaft being arranged so that said board can vibrate with said shaft on opposite sides thereof, an intermediately-arranged mechanism with which said board engages when depressed and whereby the movement of the same rotates the type-wheel, pins or keys arranged and working independently in said board and adapted to be depressed, and each of said pins engaging with means operating to limit or control the extent of movement of the key-board, and the intermediately-arranged type-wheel-operating mechanism, for the purposes set forth.

15. In a type-writing machine, a rotating type-wheel, a shaft to which said wheel is secured, an independently-moving character-indicating or finger board working in unison with said type-wheel, a shaft on which said board is secured, an oscillating arm provided with a stop-plate, and means on said arm whereby said board causes the synchronous movement of the type-wheel, a rocking frame in which said parts are arranged, and independently-arranged pins placed in perforations in said board, adapted to be depressed, and engaging with projections or arms on said stop-plate arranged on the oscillating arm whereby the movement of said finger-board is limited, for the purposes set forth.

16. In a type-writing machine, the combination of the frame, a rocking frame carrying a rotating type-wheel, an oscillating shaft having an arm thereon, and independently-moving character-indicating or key board, a shaft to which said board is secured, independently-arranged stops or pins arranged and working in said board, mechanism on said oscillating arm whereby the movement of said key-board rotates the type-wheel, a stop-plate provided with arms or projections thereon co-operating with said key-board and the pins therein to automatically limit the movement of said board and also the type-wheel, an upwardly-extending post in the frame provided with a spring-actuated pin, and means arranged on the under side of the rocking frame engaging with said post and the pin therein when the rocking frame is depressed to limit the downward movement thereof, as and for the purposes set forth.

17. In a type-writing machine, a rocking frame carrying a rotating type-wheel, a character-indicating or key board having a series of depressible stop-pins, an oscillating shaft having an arm thereon, and a stop-plate having a series of projections with which said pins engage when depressed, for the purposes set forth.

18. In a type-writing machine, a rotating type-wheel, a shaft to which said wheel is secured, a pinion thereon, a toothed segment meshing with said pinion, means adapted to actuate said segment, a finger or character-indicating board provided with depressible stops or pins therein, a stop-plate having projections or shoulders thereon, a rocking frame in which said parts are arranged, provided with a bifurcated arm extending on both sides of the type-wheel shaft between which the latter is arranged, and means on said arm pivotally secured thereto and provided with a tooth or detent engaging with the pinion on the type-wheel shaft to limit the movement thereof when said means engage with a post on the frame, and thereby limit the downward movement of the rocking frame, substantially as and for the purposes set forth.

19. In a type-writing machine, a rotating type-wheel, a shaft to which is secured said type-wheel, having a pinion thereon, a toothed segment or rack meshing with said pinion, means adapted to actuate said segment or rack, a finger or character-indicating board provided with depressible stops or pins therein, a stop-plate having projections or shoulders thereon adapted to engage with said pins when depressed and thereby limit the movement of the type-wheel, and a rocking frame in which all of said parts are arranged and operate, for the purposes set forth.

20. In a type-writing machine, a type-wheel-carrying lever or shaft provided at its free end with a type-wheel, a pinion on said shaft, a toothed segment or rack meshing with said pinion, means adapted to actuate said segment or rack, a finger or character-indicating board provided with depressible stops therein, a stop-plate having projections or shoulders thereon with which said pins engage to limit the movement of the type-wheel, said type-wheel shaft being connected at its opposite end by means of a ball-and-socket joint with a crank lever or arm having a fixed fulcrum, a rock-shaft provided with arms having arranged therebetween a shaft, to one end of which said crank-lever is secured, and means for operating said lever and the type-wheel shaft, whereby a sliding movement of said shaft and its type-wheel is caused, for the purposes set forth.

21. In a type-writing machine, in combination, a spring-actuated rock-shaft provided with arms, a type-carrying wheel mounted on the free end of a shaft arranged between said arms on said rock-shaft in bearings thereon, a vibrating finger-board arranged on a shaft directly above and in line with the type-wheel shaft, an oscillating shaft provided with an oscillating arm and means for rotating said type-wheel shaft, and mechanism on one side of said oscillating shaft, arranged between arms formed on the rock-shaft, provided with a crank-lever, and connected with the type-wheel shaft for the purpose of communicating to said shaft a sliding motion and bringing to the printing-point a different row of type on the type-wheel.

22. In a type-writing machine, in combination, a frame, a reciprocally-moving paper-holding carriage, a propelling device on said carriage, a stop or locking-tooth thereon engaging with a spacing-rack on the frame, as set forth, a rock-shaft provided with a type-wheel shaft and a finger-board, arms $m^6$ on said rock-shaft, a second rock-shaft arranged beneath the finger-board and pivoted in the frame and having arms $m^2$ and $m^3$, said arms $m^6$ engaging with pins on the arms $m^3$ during their downward movement and causing the forward ends of the arms $m^2$ to be forced upward, and a plate $m$, connecting said arms, engaging with a pin on said carriage-propelling device, whereby said stop or locking-tooth on the propelling device on the carriage is caused to be lifted out of engagement with said rack in the frame, and thereby causing the said carriage to move forward, as and for the purposes set forth.

23. In a type-writing machine, in combination with a spacing-rack arranged in the frame of the machine, a paper-holding carriage, and a carriage-propelling device consisting of a pivoted lever, a pawl pivoted to said lever, a stop or locking-tooth on said lever forward, of said pawl, but back of the pivotal point thereof, whereby the same acts as a stop to the pawl when lifted clear of the rack and as a locking-tooth when in engagement with the rack, and a spring on the paper-supporting carriage adapted to engage with said pivoted lever on the carriage, for the purposes set forth.

24. In a type-writing machine, in combination with the base or bed thereof, of a carriage provided with a paper-carrying roll journaled in standards rising from the bed of said carriage and provided with one or more friction-rolls, a paper-holding frame pivotally arranged in relation to said roll in the said standards, curved slots in the side arms of said frame, a bar connecting the ends of said paper-holding frame, a paper-holding roll journaled in said slots, and springs encircling said connecting-bar engaging with the journaled ends of the paper-holding roll, all of said parts being arranged substantially as and for the purposes set forth.

25. A printing or type wheel having printing characters thereon arranged on the free end of a shaft, a pinion thereon, a toothed segment or rack meshing with said pinion, means adapted to actuate said segment or rack, a character-indicating or finger board arranged on a shaft independent of and in line with and above the type-wheel shaft, said board having a series of perforations therein, and depressible pins or stops in said perforations corresponding to the characters, all of said parts being arranged in a rocking frame, in combination with the paper-holding carriage, and means for operating the same, as set forth.

26. In a type-writing machine, the combination of a character-indicating or finger board having depressible stops therein arranged on a shaft journaled in arms extending from a rock-shaft, an oscillating shaft, a type-wheel-carrying shaft also journaled in said arms on the rock-shaft, and an independent mechanism arranged on one end of said rock-shaft and consisting of a shaft journaled in standards on said rock-shaft and having a series of keys or levers therein, means secured to one end of said key-carrying shaft and to the end of said type-wheel shaft, whereby said type-wheel-carrying shaft receives a sliding movement, a stop-plate secured to said oscillating shaft, and means thereon whereby the vibratory movement of said finger-board causes a rotating and also an up-and-down movement of said type-wheel and shaft, substantially as and for the purposes set forth.

27. In a type-writing machine, in combination, a rotating type-wheel, a finger-board, mechanism whereby the movement of said finger-board is caused to rotate said type-wheel, a rock shaft having projections thereon, an oscillating shaft pivotally arranged between said projections, provided with an arm extending therefrom and a pin on said arm, one of said projections on the rock-shaft being provided with springs secured on opposite sides thereof and a finger between said springs, whereby said oscillating arm is caused to return to its normal and unoperated position, as and for the purposes set forth.

28. In a type-writing machine, the combination of a series of pivoted keys, a rotary type-wheel having rows of type thereon secured to a shaft at one end thereof, a ball-and-socket joint at the opposite end, said keys being arranged on a shaft, one key for each row of type on the type-wheel, and suitable mechanism for connecting said shaft and the ball-and-socket joint on the type-wheel shaft for causing the sliding movement thereof when one of said keys has been depressed, for the purposes set forth.

29. In combination with a finger-board, a type-wheel, and its intermediately-arranged operating mechanism, a rock-shaft having standards thereon, a shaft therebetween, and a series of keys on said shaft, one for each row of type on the type-wheel, each of said keys being independently connected with the type-wheel shaft, and stops for limiting the downward movement of the depressed key to such a degree as will bring the row of type on the type-wheel corresponding to the depressed key to the printing-point, as set forth.

30. In a type-writing machine, the frame thereof provided with a rock-shaft having a finger-board provided with depressible stops or pins, a type-wheel and shaft, an intermediately-operating mechanism arranged thereon, standards at one side thereof on said rock-shaft, a shaft journaled in said standards, and means thereon connected with a type-wheel shaft to impart a sliding motion thereto, keys on said shaft adapted to be depressed to cause said motion of the shaft journaled between the standards, collars on said shaft from which said keys project, provided with recesses, and pins on said shaft, all of said parts being arranged substantially as and for the purposes set forth.

31. In a type-writing machine, the frame thereof provided with a rock-shaft having a finger-board provided with depressible stops or pins, a type wheel and shaft and its intermediately-operating mechanism arranged thereon, standards at one side thereof on said rock-shaft, a shaft journaled in said standards, and means thereon connected with the type-wheel shaft to impart a sliding motion thereto, keys on said shaft adapted to be depressed to cause said motion of the shaft journaled between the standards, collars on said shaft, from which keys project, provided with recesses, and pins on said shaft, stops on a plate connecting said standards to limit the degree of movement of each of said keys, a curved arm on the under side of each key working through a plate $f^3$ and provided with springs, and a spring connecting the type-wheel-shaft sliding mechanism and the stop-plate to cause the return of said type-wheel shaft and its type-wheel to its normal position when the depressed key has been released, as and for the purposes set forth.

32. In a type-writing machine, the combination, with the frame and a rock-shaft arranged on standards thereon, having a finger-board and a rotating type-wheel thereon, and means for operating said type-wheel, and also mechanism for engaging with a carriage-propelling device, of a paper-carriage-carrying device and a step-by-step operating mechanism or spacing device thereon, substantially as set forth, said spacing device consisting of a rack, a pivoted lever, a pawl pivoted to said lever, a stop on said lever forward of said pawl, said stop being adapted to act as a stop with which the pawl engages when lifted clear of the rack, a spring, and a pin or arm projecting from the end of said lever, with which said mechanism operating the carriage-propelling device engages, substantially as set forth.

33. In combination, a reciprocally-moving paper-holding carriage adapted to be directly lifted from the bed on which it moves, and actuating means for operating the carriage, an oscillating shaft journaled in the bottom of the frame provided with a pair of arms, and a connecting-plate adapted to engage with a pin projecting out from said carriage propelling or actuating device, and a second pair of arms on said oscillating shaft for operating said shaft, and for the purposes set forth.

34. In combination, an endwise-moving type-wheel-carrying shaft adapted to rotate on its axis, means for rotating the same, and an operating device for causing the sliding movement of said shaft, arranged on a rocking shaft and consisting, essentially, of a series of depressible keys arranged on a shaft $g$, secured between standards on said rock-shaft, said shaft $g$ having secured thereto a crank-arm $g'$, from which projects a pin $g^2$, a link $g^3$, provided with a ball-and-socket joint connecting said pin with the type-wheel shaft, as set forth, each of said keys being provided with collars $h'$, through which said shaft $g$ passes, recesses $h^2$ in said collars, pins $g^5$ on said shaft projecting through said recesses, and stop $f^2$, whereby the degree or extent of movement of each of said keys is limited, substantially as set forth.

35. In combination, the shaft $g$, keys $h$, provided with collars $h'$, having recesses $h^2$ therein, pins $g^5$ on said shaft, a curved arm under each one of said keys and a spring encircling said curved arms, standards to which said shaft is secured, and a plate $f^3$, connecting said standards, as shown, and through which said curved arms project and pass through perforations in said plate $f^3$ to cause the return of the keys to their normal positions, as set forth.

36. In a type-writing machine, the combination of a main frame, a rock-shaft having projections thereon, an oscillating shaft between said projections, a rotating type-wheel shaft and a type-wheel thereon, a finger-board arranged on a shaft directly above and in line with the type-wheel shaft, adapted to vibrate on either side of said shaft, means attached to said oscillating shaft connected with the finger-board and engaging with the type-wheel shaft, whereby said shaft and its type-wheel are caused to rotate, means on the under side of arms formed on said rock-shaft adapted to engage with a post on the main frame during the downward movement of said arms, whereby the type-wheel is prevented from turning after the key-board and the rock-shaft have been depressed, as and for the purposes set forth.

37. The combination, in a type-writing machine, of the propelling device secured to the paper-carriage bed, consisting of a pivoted lever $l$, a pawl $l^2$, a stop or locking-tooth $l^5$, pin $l^6$ on said lever $l$, a spring $l^4$, spacing-rack $l^3$, and a releasing device having the plate $m$ thereon adapted to engage with said pin $l^6$, and a rock-frame having arranged therein a type-wheel and a finger-board, said rock-frame moving downwardly and having means thereon engaging with said releasing-plate, whereby the spacing mechanism is actuated simultaneously with the downward movement of said rocking-frame, as and for the purposes set forth.

38. In a type-writing machine, a rotating type-wheel, a vibrating or pivoted finger-board, an oscillating shaft, mechanism thereon whereby the vibrating movement of said board is caused to rotate said type-wheel, a stop-plate $c^2$ on said oscillating arm having arms or projections $c^4$, arranged on opposite sides thereon, and depressible stops or pins in said finger-board adapted to engage with said projections or arms on the plate $c^2$ at the desired point and thereby limit the movement of the type-wheel, as and for the purposes set forth.

39. In a type-writer, the combination, with the paper-holding carriage, of a spacing device for intermittently moving said paper-holding carriage transversely across the frame of the machine, a rotating type-wheel, a shaft to which said wheel is secured, a vibrating or pivoted finger-board, mechanism whereby the vibrating movement is caused to rotate said type-wheel, an oscillating arm and a stop-plate thereon, depressible stops or pins in said finger-board, whereby the extent of movement of said board is limited, means for causing the vibrating movement of the finger-board to operate the oscillating arm, a rocking frame in which all of said parts are arranged, and devices, substantially as described, for simultaneously engaging with said spacing device when the rock-frame has been depressed, and thereby moving said paper-holding carriage intermittently and transversely across the frame of the machine in a direction at a right angle to the axis of the type-wheel shaft.

40. In a type-writing machine, the combination, with a paper-holding carriage, of a spacing device for intermittently moving said carriage transversely across the frame of the machine, a rotating type-wheel and shaft arranged at right angles with respect to said carriage, a pinion on said shaft, an oscillating arm carrying a toothed segment meshing with said pinion, a stop-plate secured to and moving with said oscillating arm, a vibrating or pivoted finger-board arranged above said stop-plate and provided with depressible stops or pins, which when depressed engage with the stop-plate and limit the extent of movement of said board, and means for causing the vibrating movement of the finger-board to operate the oscillating arm, for the purposes set forth.

41. A type-writing machine provided with a rocking frame having a rotating type-wheel shaft and a type-wheel thereon, mechanism arranged in said frame for rotating said type-wheel, as set forth, and an ink-roll-supporting rod pivotally supported on the rocking frame back of the rotating type-wheel thereon, and a spring $i^6$, arranged as and for the purposes set forth.

42. In combination, a rocking frame having arms $b$, a rotating type-wheel and shaft thereon, an inking device consisting of an inking-roll I, secured to an arm $i$ by means of a bar or rod $i^3$, said arm $i$ being bent or curved beneath the arms $b$ so as to hold said inking-roll normally out of the path of movement of the type-wheel, and said arm $i$ being secured back of said type-wheel to said rod $i^7$, which is pivoted at $i'$ on the arms $b$, and a spring $i^6$, substantially as specified.

43. In combination, a rocking frame having arms $b$, a rotating type-wheel and shaft thereon, a vibrating finger-board arranged on a shaft directly above and in line with the type-wheel shaft, adapted to vibrate on either side thereof, a pinion on said shaft, a toothed segment meshing with said pinion, and means consisting, essentially, of an arm or lever $b^{12}$, pivoted in lugs on the under side of said arms $b$ and having a locking-point, said lever engaging with a spring-actuated pin in a post $a^2$ during the downward movement of said rocking frame, whereby said locking-point engages with the pinion on the type-wheel shaft and prevents any further movement, as and for the purposes set forth.

In testimony that I claim the invention set forth above I have hereunto set my hand this 7th day of March, 1888.

GEORGE B. WEBB.

Witnesses:
JOHN G. TRUSDELL,
FREDK. C. FRAENTZEL.